United States Patent
Bal et al.

(10) Patent No.: US 10,351,424 B2
(45) Date of Patent: Jul. 16, 2019

(54) NANO NI—ZR OXIDE CATALYST FOR ACTIVATION OF METHANE BY TRI-REFORMING AND A PROCESS FOR THE PREPARATION THEREOF

(71) Applicant: COUNCIL OF SCIENTIFIC & INDUSTRIAL RESEARCH, New Delhi (IN)

(72) Inventors: Rajaram Bal, Dehradun (IN); Rajib Kumar Singha, Dehradun (IN); Ankur Bordoloi, Dehradun (IN); Chandrashekar Pendem, Dehradun (IN); Laxmi narayan Sivakumar Konathala, Dehradun (IN)

(73) Assignee: COUNCIL OF SCIENTIFIC & INDUSTRIAL RESEARCH, New Delhi (IN)

( * ) Notice: Subject to any disclaimer, the term of this patent is extended or adjusted under 35 U.S.C. 154(b) by 1 day.

(21) Appl. No.: 15/085,697

(22) Filed: Mar. 30, 2016

(65) Prior Publication Data

US 2016/0289073 A1 Oct. 6, 2016

(30) Foreign Application Priority Data

Mar. 30, 2015 (IN) .......................... 0874/DEL/2015

(51) Int. Cl.
  *C01B 3/40* (2006.01)
  *B01J 37/04* (2006.01)
  *B01J 37/03* (2006.01)
  *B01J 23/755* (2006.01)

(52) U.S. Cl.
  CPC .............. *C01B 3/40* (2013.01); *B01J 23/755* (2013.01); *B01J 37/031* (2013.01); *B01J 37/04* (2013.01); *C01B 2203/0233* (2013.01); *C01B 2203/0238* (2013.01); *C01B 2203/0244* (2013.01); *C01B 2203/0261* (2013.01); *C01B 2203/0844* (2013.01); *C01B 2203/1041* (2013.01); *C01B 2203/1058* (2013.01); *C01B 2203/1241* (2013.01); *Y02P 20/52* (2015.11)

(58) Field of Classification Search
  CPC ...................................................... C01B 3/40
  See application file for complete search history.

(56) References Cited

U.S. PATENT DOCUMENTS

| | | | |
|---|---|---|---|
| 1,558,559 A | 10/1925 | Mittasch et al. | 518/714 |
| 4,010,025 A * | 3/1977 | Fraioli | B01J 23/755 502/330 |
| 2008/0260628 A1 * | 10/2008 | Moon | B01J 23/10 423/648.1 |
| 2013/0065751 A1 * | 3/2013 | Hong | B01J 23/755 502/259 |

FOREIGN PATENT DOCUMENTS

WO   WO 2011/112152   * 9/2011

OTHER PUBLICATIONS

Nickel-loaded Zirconia Catalysts with Large Specific Surface Area for High-temperature Catalytic Applications. Andreas Peters et al. ChemCatChem vol. 3, pp. 598-606, 2011.*
Chunshan Song and Wei Pan, "Tri-reforming of methane: a novel concept for synthesis of industrially useful synthesis gas with desired h2/co ratios using co2 in flue gas of power plants without co2 separation", Prepr. Pap.-Am. Chem. Soc., Div. Fuel Chem. 2004, 49 (1), 128.
Jesus Manuel Garcia-Vargas et al., "Methane tri-reforming over a Ni/β-SiC-based catalyst: Optimizing the feedstock composition", International Journal of Hydrogen Energy (2013), 38(11), 4524-4532.
Maciel et al., "Kinetic evaluation of the tri-reforming process of methane for syngas production", Reaction Kinetics, Mechanisms and Catalysis, 101(2): 407-416, 2010.
Pino et al., "Hydrogen production by methane tri-reforming process over Ni-ceria catalysts: Effect of La-doping", Applied Catalysis, B: Environmental (2011), 104(1-2), 64-73.
Tracy Benson, Symposia—American Chemical Society, Division of Fuel Chemistry (2012), 57(1), 839-840.
Wood et al., "Tri-reforming of methane over Ni@SiO2 catalyst", International Journal of Hydrogen Energy (2014), 39(24), 12578-12585.

* cited by examiner

*Primary Examiner* — Douglas B Call
(74) *Attorney, Agent, or Firm* — Norton Rose Fulbright US LLP

(57) ABSTRACT

The present invention provides a Ni—Zr oxide catalyst and a process for the preparation of the catalyst. The invention further provides use of the catalyst for the production of synthesis gas (a mixture of CO and $H_2$) by Tri-reforming of methane. The process provides a direct single step selective vapor phase partial oxidation of methane to synthesis gas over Ni—$ZrO_2$ catalyst between temperature range of 600° C. to 800° C. at atmospheric pressure. The process provides a methane conversion of 1-99% with $H_2$ to CO mole ratio of 1.6 to 2.2.

11 Claims, 12 Drawing Sheets

NANO NI—ZR OXIDE CATALYST FOR ACTIVATION OF METHANE BY TRI-REFORMING AND A PROCESS FOR THE PREPARATION THEREOF

CROSS-REFERENCE TO RELATED APPLICATIONS

This application claims priority to Indian Patent Application No. 0874/DEL/2015 filed Mar. 30, 2015, the entire contents of which are incorporated herein by reference without disclaimer.

FIELD OF THE INVENTION

The present invention relates to a Nano Ni—$ZrO_2$ catalyst for activation of methane and a process for the preparation thereof. Particularly, the present invention relates to a process for the activation of methane for the production of syngas using Nano Ni—Zr oxide catalyst. More particularly, the present invention relates to a process for the Tri-reforming of methane to syngas with $H_2$ to CO molar ratio of 1.6 to 2.2 at atmospheric pressure over Ni—$ZrO_2$ solid catalysts.

BACKGROUND AND PRIOR ART OF THE INVENTION

Synthesis gas, source for the large scale production of synthetic fuels including methanol, DME (dimethyl ether) and other varied hydrocarbons and their products. Industrially synthesis gas is produced form steam reforming of methane. Synthesis gas is a variable composition of carbon monoxide and hydrogen and is the basis of Fischer-Tropsch chemistry. Synthesis gas can be produced by other processes like partial oxidation of methane, dry reforming of methane, autothermal reforming of methane, bi-reforming of methane, tri-reforming of methane. By these processes a variable composition of carbon monoxide and hydrogen can be produced.

Methanol and its derivatives are significant fuels and starting materials for varied chemical products. The current production of methanol is based on syngas following a process first developed by Mittasch et. al. in 1923 and then improved over the years by companies including BASF and ICI. However, the need for a wider use of methanol is a more efficient and economic pathway of preparation.

The main requirement for the synthesis of methanol from syngas is the ratio of $H_2$/CO of 2. The most commonly and industrially used method for the synthesis gas production is steam reforming of methane. But steam reforming of methane produces $H_2$/CO ratio of 3. Therefore, it is evident that additional steps are required to get the desired $H_2$/CO ratio for the methanol production. Now, dry reforming or carbon dioxide reforming of methane produces $H_2$/CO ratio 1. So, extra hydrogen has to be supplied for the desired $H_2$/CO ratio to produce methanol. Partial oxidation of methane is a process where we can get the exact required $H_2$/CO ratio for the production of methanol. But the main problem with the partial oxidation is it is difficult to control and can lead to hot spot generation which can be dangerous and increases the possibility of explosions.

Now, tri-reforming of methane is a very new idea for the production of synthesis gas with variable $H_2$/CO ratio. The $H_2$/CO ratio can be varied by using different ratios of feed gas. We can get the exact $H_2$/CO ratio 2 by maintaining a definite ratio of feed gas. This specific ratio of $H_2$/CO of synthesis gas is named as "met gas" to underline its difference from the widely used synthesis gas. This specific 2/1 ratio of $H_2$/CO gas mixture is for the preparation of methanol with complete utilization of all the hydrogen.

Tri-reforming of methane combines three processes for the production of synthesis gas, (1) Partial oxidation of methane, (2) Dry or carbon dioxide reforming of methane and (3) steam reforming of methane. In this process three reactions runs simultaneously to produce synthesis gas. Both dry and steam reforming are endothermic reactions whereas partial oxidation is an exothermic reaction. Therefore the heat generated in partial oxidation can be utilized with no loss of heat. The partial oxidation of methane also produces $CO_2$ and $H_2O$ which also can be utilized during the reaction without any loss of reaction feed. These advantages makes this process quit economic and energy saving.

For the reforming processes Ni based catalysts are mostly studied for its activity and availability. But the main problem of nickel based catalysts is its tendency towards coking during the reaction which leads to hot spot generation and it can lead to explosion. Noble metal based catalysts are also very reactive and coke resistant but the cost and the availability makes their used bounded.

Reforming is frequently affected by coking, involving the deposition of carbon in the form of soot or coke on the catalyst bed (reducing strongly its activity. Carbon may be formed by both $CH_4$ (natural gas) decomposition and CO disproportionation (Boudouard reaction). The relative contributions depend on the reaction conditions and catalyst used. The undesired formation of carbon is, however, largely prevented by the presence of steam and short residence times in the flow reactor.

Joseph Wood et. al. reported in International Journal of Hydrogen Energy (2014), 39(24), 12578-12585, use of Ni@$SiO_2$ catalyst for tri-reforming of methane. They reported 71.2 and 63.0 methane and $CO_2$ conversion at 750° C. with $CH_4$:$CO_2$:$H_2O$:$O_2$:He feed ratio 1:0.5:1.0:0.1:0.4 and the drawback of the report is the catalyst stability. The catalyst shows deactivation after 4 hours' time.

Chunshan Song and Wei Pan reported in Prepr. Pap.-Am. Chem. Soc., Div. Fuel Chem. 2004, 49 (1), 128 use of different catalysts like Ni—MgO, Ni—$CeO_2$, Ni—$ZrO_2$, Ni—$CeZrO_2$, Ni—MgO—$CeZrO_2$ etc. with $CH_4$:$CO_2$:$H_2O$:$O_2$ feed ratio=1:0.475:0.475:0.1 at 850° C. under 1 atm. and the maximum conversion showed is 98.5, 84.5 for methane and $CO_2$ respectively over Ni—MgO catalyst.

Jesus Manuel Garcia-Vargas et. al. reported in International Journal of Hydrogen Energy (2013), 38(11), 4524-4532, use of Ni/β-siC-based catalyst for the tri-reforming of methane. They reported 95.9% methane conversion at 800° C.

Tracy J Benson presented at Symposia-American Chemical Society, Division of Fuel Chemistry (2012), 57(1), 839-840 use of Ni catalyst supported on titanium oxide.

In Applied Catalysis, B: Environmental (2011), 104(1-2), 64-73 where Lidia Pino et. al. reported tri-reforming of methane over Ni—$CeO_2$ catalysts with different La loadings at 800° C. with $CH_4$ and $CO_2$ conversion of 96% and 86.5% respectively.

In Reaction Kinetics, Mechanisms and Catalysis, Volume 101, Issue 2, Pages 407-416 where Leonardo J. L. Maciel et. al. reported conversion of methane and carbon dioxide with Ni/γ-$Al_2O_3$ catalyst at 727° C.

Joseph Wood reported in International Journal of Hydrogen Energy (2014), 39(24), 12578-12585 where use of Ni@$SiO_2$ core shell catalyst for the tri-reforming of methane. They reported 71.2% and 63.0% methane and $CO_2$ conversion at 750° C. with $CH_4$:$CO_2$:$H_2O$:$O_2$:He feed ratio 1:0.5:1.0:0.1:0.4 and the drawback of the report is the catalyst stability. The catalyst shows deactivation after 4 hours.

OBJECTS OF THE INVENTION

The main object of the present invention is to provide Nano Ni—Zr oxide catalyst for activation of methane and a process for the preparation thereof.

Another objective of the present invention is to provide a process for activation of methane to syngas over Nano Ni—Zr oxide catalyst.

Still another object of the present invention is to provide a process, which selectively gives syngas from methane with $H_2/CO$ mole ratio between 1.6 to 2.2.

Yet another object of the present invention is to provide a process which uses most abandoned natural gas having the potential to become the main source for the future fuel alternatives to produce synthesis gas, which is the main composition for the production of hydrocarbon by means of Fischer-Tropsch process.

Yet another object of the present invention is to provide a process which works under continuous process at atmospheric pressure for the production synthesis gas from methane.

Yet another object of the present invention is to provide a process which works under continuous process at atmospheric pressure for the production synthesis gas from methane, carbon dioxide and water.

Yet another object of the present invention is to provide a catalyst with a mixture of Ni and Zr oxide which can be prepared easily and also very economical to produce syngas by Tri-reforming of methane.

SUMMARY OF THE INVENTION

Accordingly, present invention provides a nano Ni—Zr oxide catalyst having formula NiO—$ZrO_2$ comprises NiO in the range of 1-10 wt % and $ZrO_2$ in the range 90-99 wt %.

In an embodiment, present invention provides a process for the preparation of Nano Ni—Zr oxide catalyst and the said process comprising the steps of:
(a) stirring the solution of Zr salt, Ni-salt, a surfactant and $H_2O$ for a period ranging between 2-3 hours. at a temperature ranging between 25-350° C. followed by adding hydrazine hydrate then $Na_2CO_3$ solution to adjust the pH in the range of 11-12;
(b) stirring the reaction mixture obtained in step (b) for a period ranging between 1-3 hours at temperature ranging between 25-350° C. followed by heating the mixture in an autoclave at temperature ranging between 170° C. to 180° C. for the time period ranging between 18-24 hours to obtain precipitate;
(c) filtering the precipitate as obtained in step (b) with water and ethanol then dried at temperature ranging between 60° C.-110° C. for a time period ranging between 15-20 hours followed by calcining the dried product at a temperature in the range of 400-750° C. for a time period in the of 4-10 hours to obtain Ni—Zr oxide.

In another embodiment of the present invention, the Zr salt used in step (a) is zirconium propoxide.

In another embodiment of the present invention, the Ni salt used in step (a) is nickel nitrate hexahydrate.

In yet another embodiment of the present invention, the surfactant used in step (a) is CTAB (Cetyltrimethyl ammonium bromide).

In yet another embodiment of the present invention, wt % ratio of Ni and Zr is in the range of 1:99 to 10:90.

In an embodiment, present invention provides a process for activation of methane using Ni—$ZrO_2$ catalyst to obtain syngas wherein the said process comprising the steps of:
i. passing $O_2:CO_2:H_2O:CH_4$:He in the ratio ranging between 1:1:1.7:5:18 to 1:1:2.4:5:18 ratio in a reactor at atmospheric pressure in the presence of Ni—$ZrO_2$ catalyst at a temperature ranging between 600-800° C. for a period ranging between 1-70 hours at a gas hourly space velocity (GSHV) ranging between 20000-400000 ml$g^{-1}$ $h^{-1}$ to obtain syngas.

In yet another embodiment of the present invention, the conversion percentage of methane is in the range of 1-97%.

In yet another embodiment of the present invention, the conversion percentage of $CO_2$ is in the range of 1-98%.

In yet another embodiment of the present invention, the conversion percentage of $O_2:CO_2:H_2O:CH_4$:He steam is in the range of 1-98%.

In yet another embodiment of the present invention, the $H_2/CO$ ratio of syngas obtained is in the range of 1.8-2.2.

Still in another embodiment of the present invention, the activation of methane by Tri-reforming is done at 600° C.

DETAILED DESCRIPTION OF THE INVENTION

Present invention provides a nano Ni—Zr oxide catalyst having formula NiO—$ZrO_2$ comprises NiO in the range of 1-10 wt % and $ZrO_2$ in the range 90-99 wt %.

The present invention also provides a process for the preparation of Nano Ni—Zr oxide catalyst.

Synthesis of Ni—Zr oxide was carried out using gel composition of Zirconium propoxide, Nickel nitrate hexahydrate, Cetyltrimethylammonium bromide (CTAB), 1(M) $Na_2CO_3$ solution where Zirconium propoxide was used as the precursor of Zr.

The molar ratio of Ni to CTAB varied in the range of 1:0.75-1.0.

The pH of the gel was adjusted between 11-12.

The molar ratio of $H_2O$ to Zr varied in the range of 100-150.

The mixing gel was stirred for 1-3 h at room temperature.

Heating of the resultant solution was carried out in a closed autoclave at 180° C. for 18-24 hours.

The product was filtered with excess water and ethanol then dried in an oven with temperature range of 60-110° C. for 15-20 h. The dried product was calcined in a furnace in the temperature range of 400-750° C. for 4-10 h.

General Procedure for the Tri-Reforming of Methane to Synthesis Gas

The Tri-reforming of methane was carried out in a fixed-bed down flow reactor at atmospheric pressure. Typically 10 to 500 mg of catalyst was placed in between two quartz wool plugged in the center of the 6 mm quartz reactor. The reaction was carried out with the freshly prepared catalyst at different temperatures ranging 600-800° C. The gas hourly space velocity (GHSV) was varied between 20000 to 400000 ml $g^{-1}$ $h^{-1}$ with a molar ratio of $O_2$:$CO_2$:$H_2O$:$CH_4$:He of 1:1:1.7:5:18 to 1:1:2.4:5:18. The reaction products were analyzed using an online gas chromatography (Agilent 7890A) fitted with a TCD detector using two different columns Molecular sieves (for analyzing $H_2$) and Pora-Pack-Q (for analyzing $CH_4$, $CO_2$ and CO).

EXAMPLES

The following examples are given by way of illustration and therefore should not be constructed to limit the scope of the present invention.

Example 1

Preparation of 2.5% Ni—$ZrO_2$ 5.4 gm of Zirconium propoxide was taken in a beaker. 20 ml of water was added into it further stirred the solution for 30 min at temperature 30° C. 0.11 gm of nickel nitrate hexahydrate solution in 10 ml water was added in to it followed by continued stirring for 15 min. Added 0.15 gm CTAB solution in 10 ml ethanol to the previous mixture followed by pH of the solution was maintained to 12 using 1(M)$Na_2CO_3$ solution. The whole mixture was continued stirring for 2 hours at temperature 30° C. After that the total mixture was kept into an autoclave for 24 hours. at 180° C. After 24 hours. the precipitate was washed with water and then ethanol. The precipitate was dried at 110° C. overnight for 15 hours. Then the material was calcined at 550° C. for 6 hours.

Figure 1:
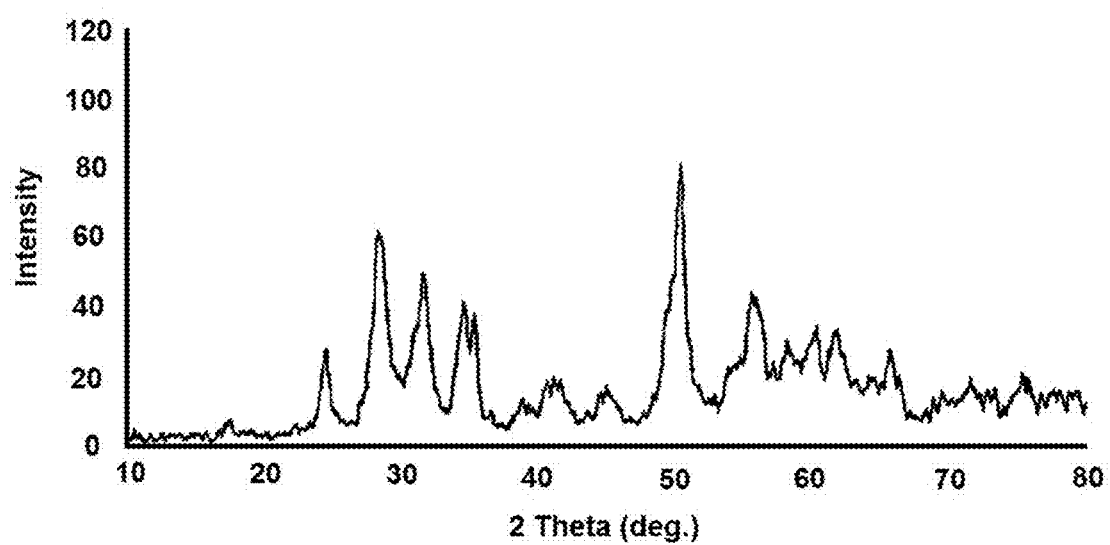
FIG. 1 X-ray Diffraction (XRD) of 2.5% Ni—$ZrO_2$.
Figure 2:
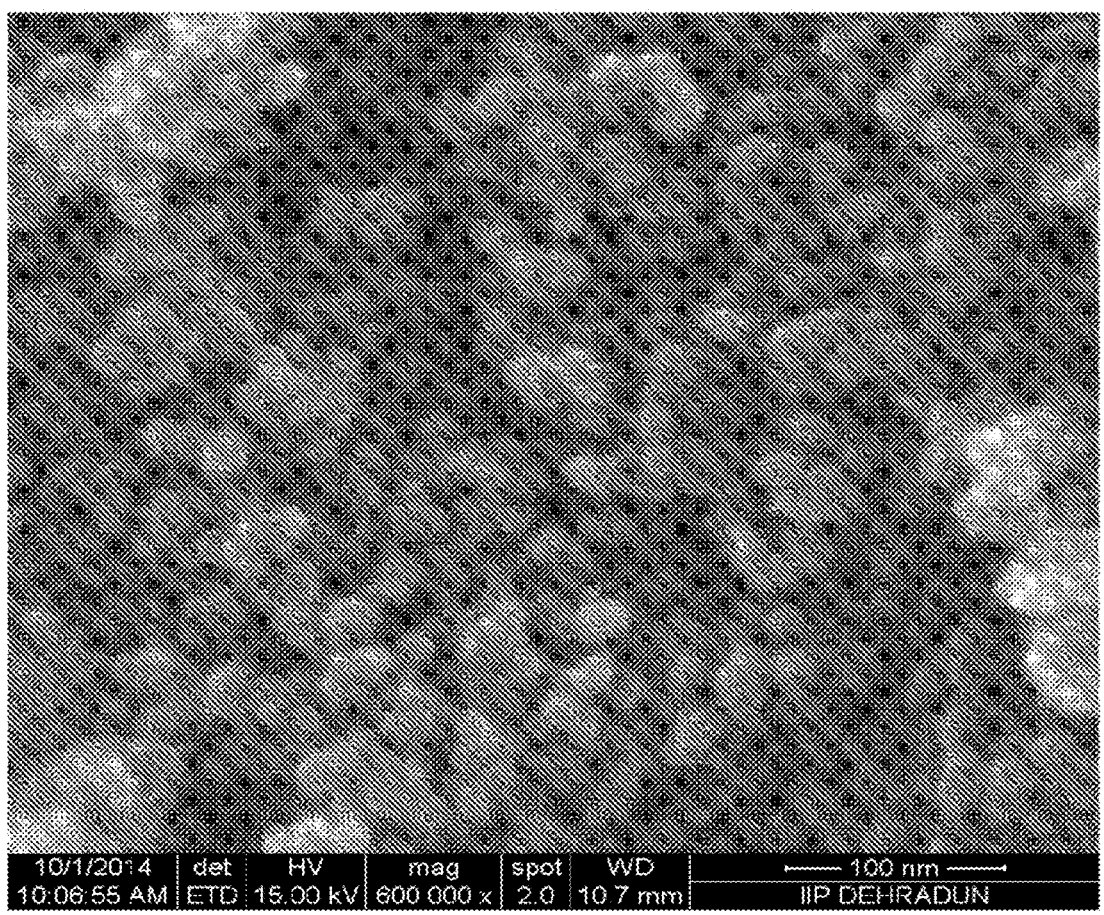
FIG. 2 Scanning Electron Microscope (SEM) image of 2.5% Ni—$ZrO_2$.
Figure 3:
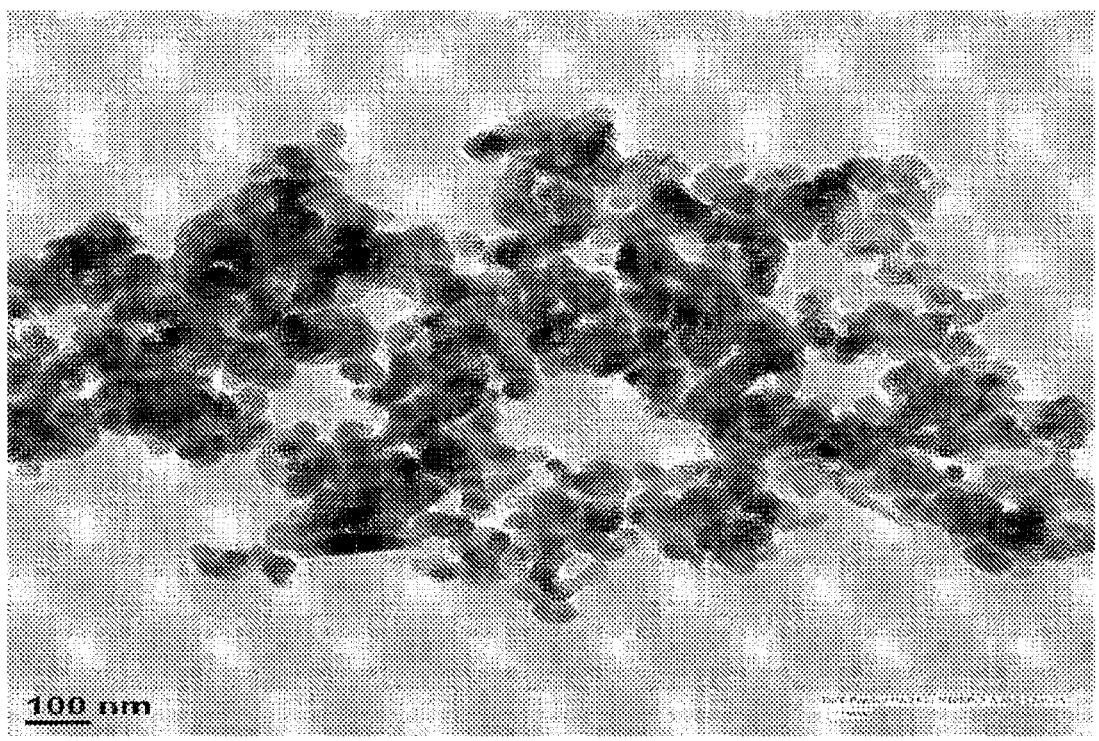
FIG. 3 Low magnification Transmission Electron Microscope (TEM) image of 2.5% Ni—$ZrO_2$.
Figure 4:
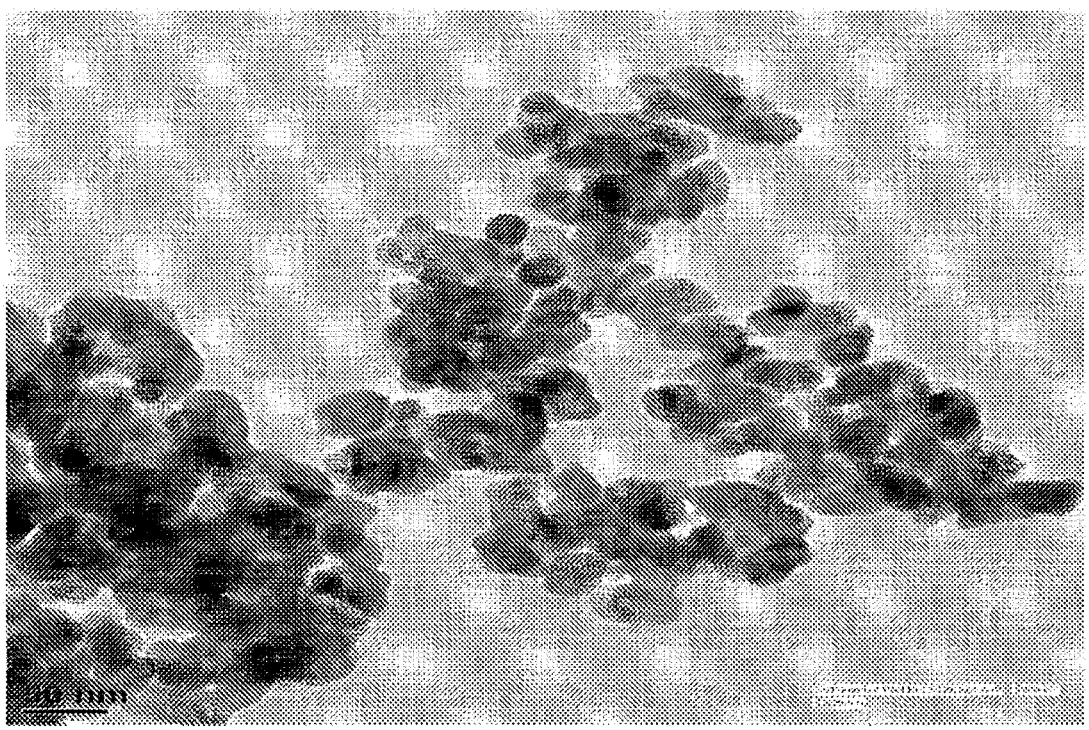
FIG. 4 High magnification TEM image of 2.5% Ni—$ZrO_2$.
Figure 5:
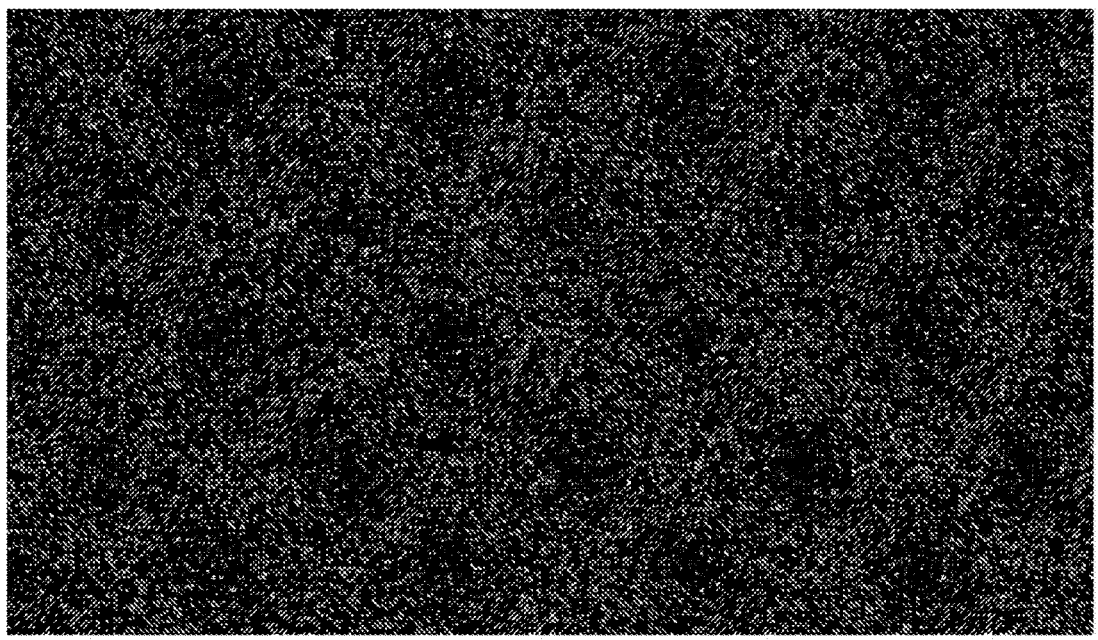
FIG. 5 Mapping of Zr in 2.5% Ni—$ZrO_2$.
Figure 6:
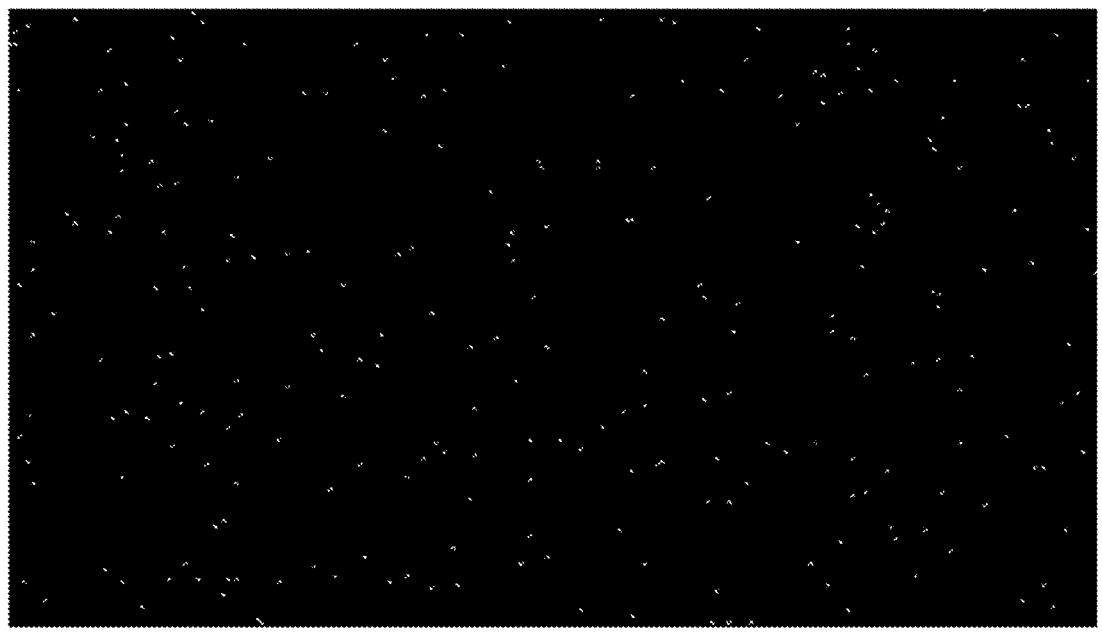
FIG. 6 Mapping of Ni in 2.5% Ni—$ZrO_2$.

The material was characterized by XRD, SEM, elemental mapping and TEM. The XRD pattern of the 2.5% Ni—$ZrO_2$ is shown in FIG. 1. XRD depicts the presence of NiO and $ZrO_2$ in the sample. The morphology of the material (2.5% Ni—$ZrO_2$) was characterized by SEM. The typical image of the 2.5% Ni—$ZrO_2$ is shown in FIG. 2. From the SEM image it is clear that the particles are almost spherical in shape. The typical TEM images of the 2.5% Ni—$ZrO_2$ are shown in FIG. 3-4. FIG. 3 is the TEM images at low magnification and FIG. 4 is the image of the 2.5% Ni—$ZrO_2$ at very high magnification. The dispersion of the Ni particles on $ZrO_2$ support was analyzed by taking the elemental mapping of Ni and Zr using SEM as shown in FIG. 5 and FIG. 6. The mapping confirms that Ni is highly dispersed on $ZrO_2$.

Example 2

Preparation of 5% Ni—$ZrO_2$ 5.4 gm of Zirconium propoxide was taken in a beaker. 20 ml of water was added into it further stirred the solution for 30 min at temperature 30° C. 0.23 gm of nickel nitrate hexahydrate solution in 10 ml water was added in to it followed by continued stirring for 15 min. Added 0.30 gm CTAB solution in 10 ml ethanol to the previous mixture followed by pH of the solution was maintained to 12 using 1(M)$Na_2CO_3$ solution. The whole mixture was continued stirring for 2 hours at temperature 30° C. After that the total mixture was kept into an autoclave for 24 hours. at 180° C. After 24 hours, the precipitate was washed with water and then ethanol. The precipitate was dried at 110° C. overnight for 15 hours. Then the material was calcined at 550° C. for 6 hours.

Figure 7:
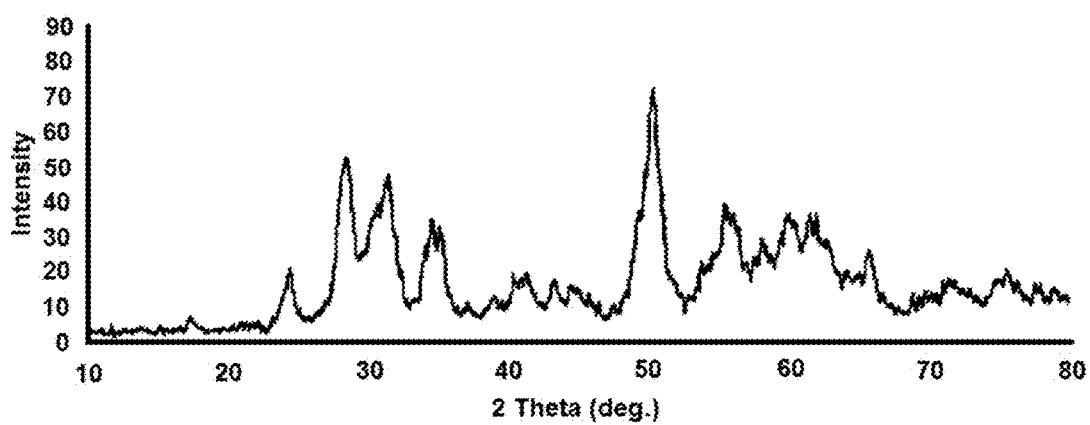
FIG. 7 X-ray Diffraction (XRD) of 5% Ni—$ZrO_2$.
Figure 8:
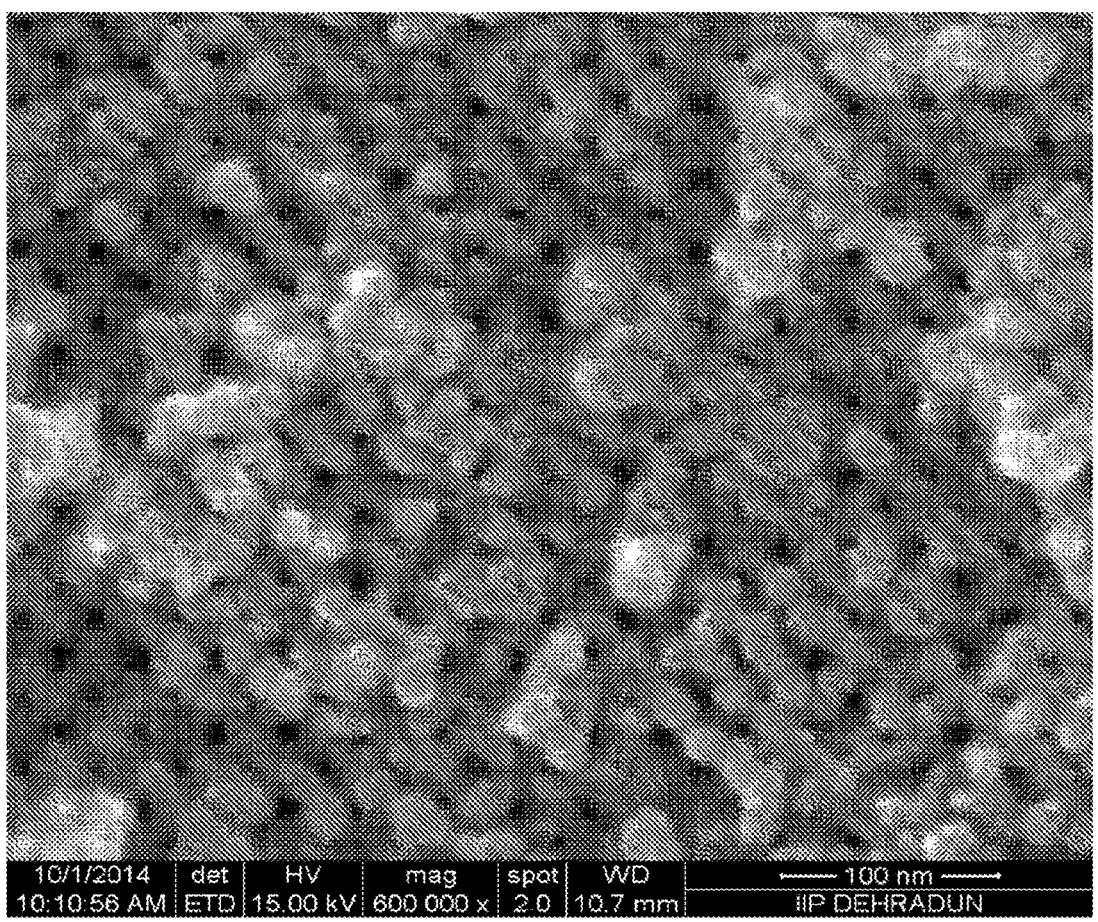
FIG. 8 SEM image of 5% Ni—$ZrO_2$.
Figure 9:
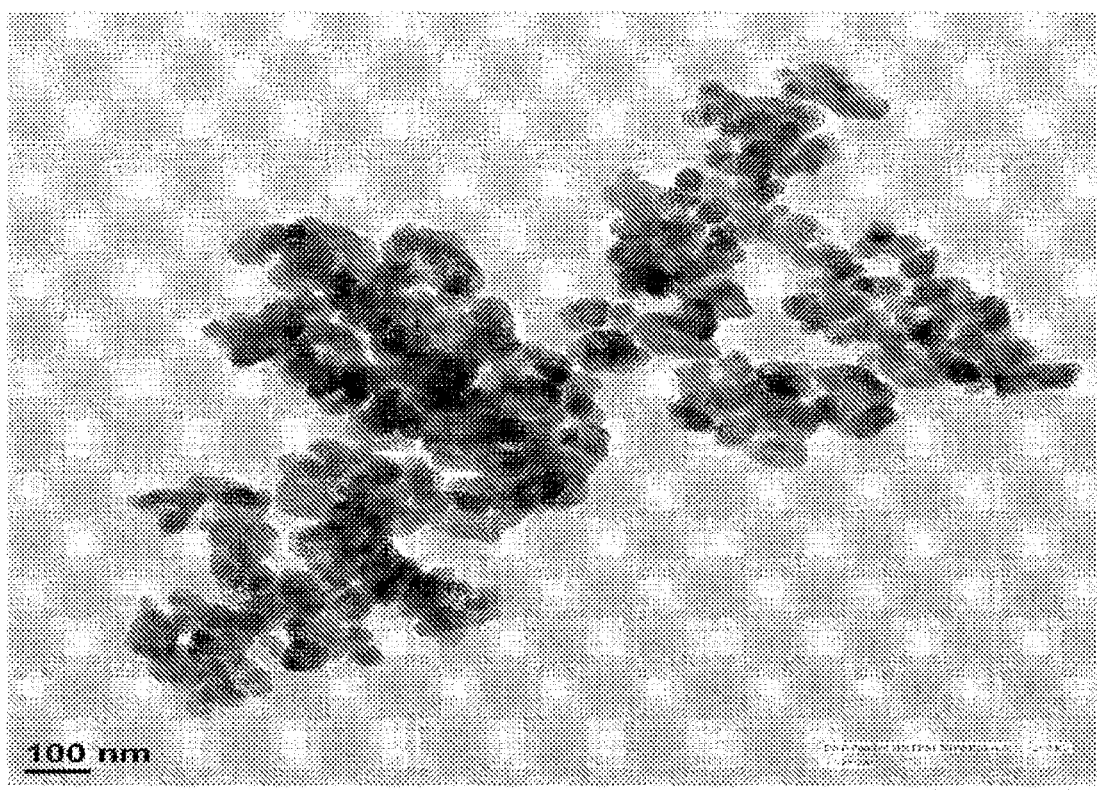
FIG. 9 Low magnification TEM image of 5% Ni—$ZrO_2$.
Figure 10:
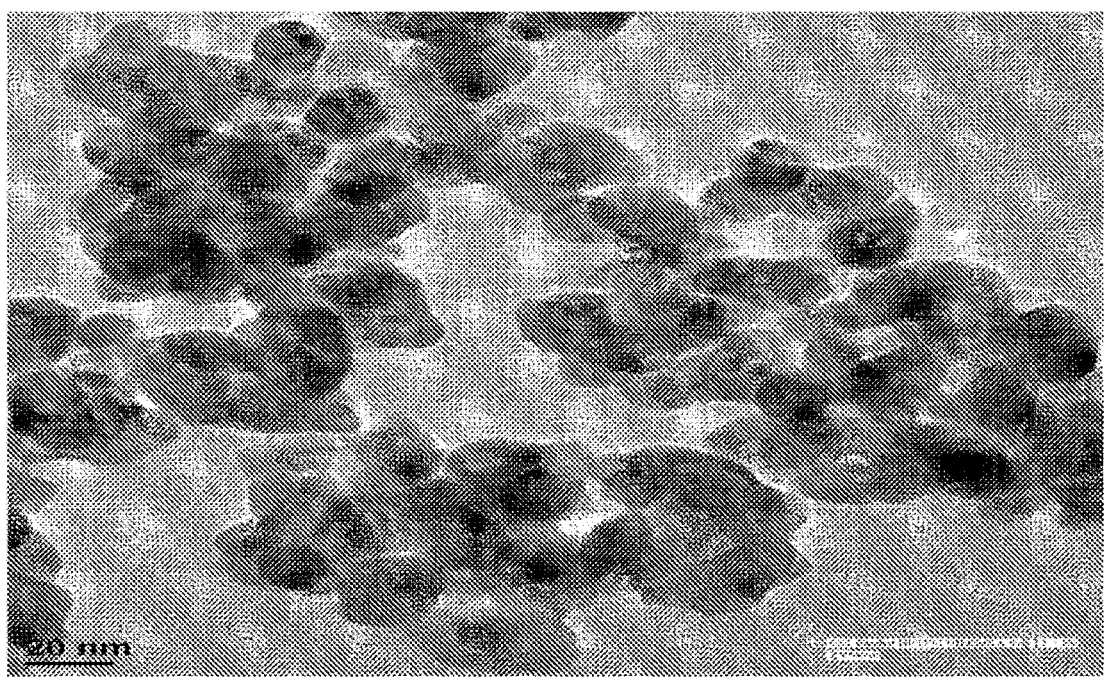
FIG. 10 High magnification TEM image of 5% Ni—$ZrO_2$.
Figure 11:
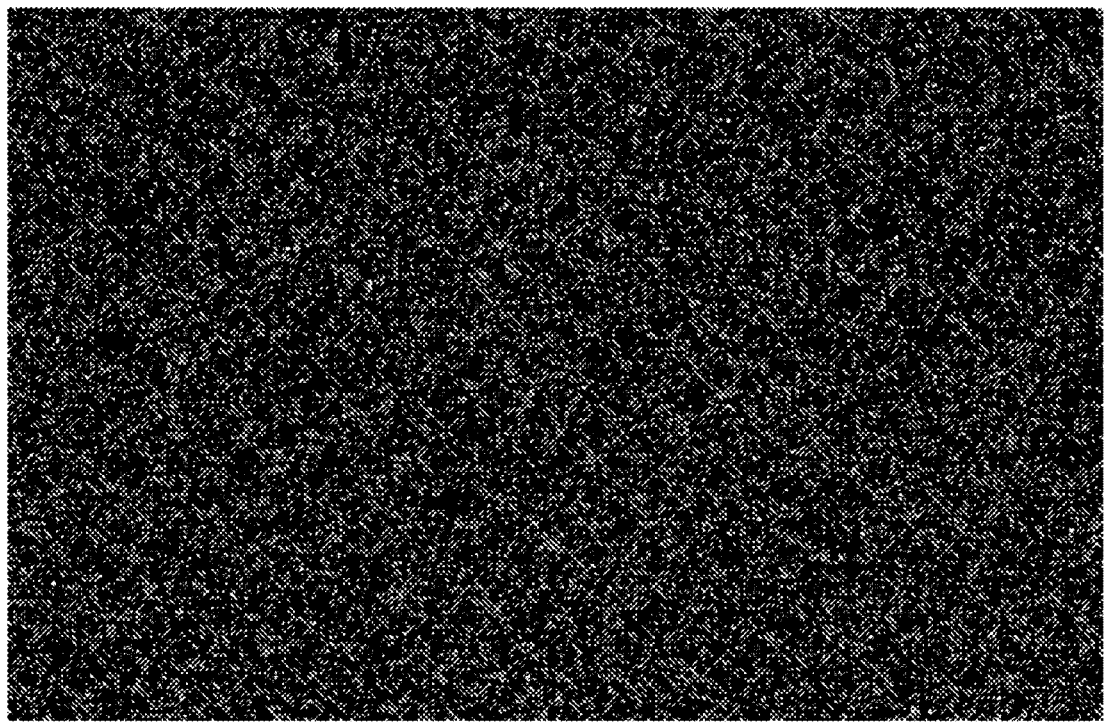
FIG. 11 Mapping of Zr in 5% Ni—$ZrO_2$.
Figure 12:
FIG. 12 Mapping of Ni in 5% Ni—$ZrO_2$.

The material was characterized by XRD, SEM, elemental mapping and TEM. The XRD pattern of the 5% Ni—$ZrO_2$ is shown in FIG. 7. XRD depicts the presence of NiO and $ZrO_2$ in the sample. The morphology of the 5% Ni—$ZrO_2$ catalyst was characterized by SEM. The typical image of the 5% Ni—$ZrO_2$ is shown in FIG. 8. From the SEM image it is clear that the particles are almost spherical in shape. The typical TEM images of the 5% Ni—$ZrO_2$ are shown in FIG. 9-10. FIG. 9 is the TEM images at low magnification and FIG. 10 is the image of the 5% Ni—$ZrO_2$ at very high magnification. The dispersion of the Ni particles on $ZrO_2$ support was analyzed by taking the elemental mapping of Ni and Zr using SEM as shown in FIG. 11 and FIG. 12. The mapping confirms that Ni is highly dispersed on $ZrO_2$.

Example 3

The example describes the effect of temperature on conversion and $H_2$/CO ratio of Tri-reforming of methane. The product analysis presented in Table-1.

Process Conditions

Catalyst: 0.06 g

Ni:$ZrO_2$ weight ratio in the catalyst=2.5:97.5.

Process pressure: 1 atm.

Gas hourly space velocity (GHSV): 80000 ml $g^{-1}$ $h^{-1}$

Reaction time: 4 h $O_2$:$CO_2$:$H_2O$:$CH_4$:He=1:1:2.1:5:18 (mol %)

TABLE 1

| | Effect of temperature on conversion | | | |
|---|---|---|---|---|
| Temperature (° C.) | Methane Conversion (%) | $CO_2$ Conversion (%) | $H_2O$ Conversion (%) | $H_2$/CO ratio |
| 600 | 0 | 0 | 0 | — |
| 700 | 81.4 | 79.5 | 76.4 | 1.9 |
| 800 | 95.3 | 94.3 | 98.8 | 1.9 |

Example 4

The example describes the effect of temperature on conversion and $H_2$/CO ratio of Tri-reforming of methane. The product analysis presented in Table-1.

Process Conditions

Catalyst: 0.06 g

Ni:$ZrO_2$ weight ratio in the catalyst=5:95.

Process pressure: 1 atm.

Gas hourly space velocity (GHSV): 80000 ml $g^{-1}$ $h^{-1}$

Reaction time: 4 h $O_2$:$CO_2$:$H_2O$:$CH_4$:He=1:1:2.1:5:18 (mol %)

TABLE 2

Effect of temperature on conversion

| Temperature (° C.) | Methane Conversion (%) | $CO_2$ Conversion (%) | $H_2O$ Conversion (%) | $H_2$/CO ratio |
|---|---|---|---|---|
| 600 | 2 | 0 | 0 | — |
| 700 | 85.3 | 87.7 | 87.5 | 1.9 |
| 800 | 98.2 | 99.4 | 99.3 | 1.9 |

Example 5

The example describes the effect of temperature on conversion and $H_2$/CO ratio of Tri-reforming of methane. The product analysis presented in Table-1.

Process Conditions
  Catalyst: 0.06 g
  Ni:$ZrO_2$ weight ratio in the catalyst=10:90.
  Process pressure: 1 atm.
  Gas hourly space velocity (GHSV): 80000 ml g$^{-1}$ h$^{-1}$
  Reaction time: 4 h
  $O_2$:$CO_2$:$H_2O$:$CH_4$:He=1:1:2.1:5:18 (mol %)

TABLE 3

Effect of temperature on conversion

| Temperature (° C.) | Methane Conversion (%) | $CO_2$ Conversion (%) | $H_2O$ Conversion (%) | $H_2$/CO ratio |
|---|---|---|---|---|
| 600 | 0.8 | 0.8 | 0.9 | — |
| 700 | 74 | 78 | 76 | 1.9 |
| 800 | 87 | 89 | 89 | 1.9 |

Example 6

The example describes the effect of gas hourly space velocity on the conversion of methane and $H_2$/CO ratio of Tri-reforming of methane. The product analysis presented in Table-3.

Process Conditions
  Catalyst: 0.030 g
  Ni:$ZrO_2$ weight ratio in the catalyst=5:95.
  Process pressure: 1 atm.
  Gas hourly space velocity (GHSV): 160000 ml g−1 h−1
  Reaction time: 4 h
  $O_2$:$CO_2$:$H_2O$:$CH_4$:He=1:1:2.1:5:18 (mol %)

TABLE 3

Effect of temperature on conversion

| Temperature (° C.) | Methane Conversion (%) | $CO_2$ Conversion (%) | $H_2O$ Conversion (%) | Syngas $H_2$/CO ratio |
|---|---|---|---|---|
| 600 | 2 | 0 | 0 | — |
| 700 | 85.56 | 85.89 | 85.48 | 1.9 |
| 800 | 97.32 | 98.56 | 98.23 | 1.9 |

Example 7

The example describes the effect of gas hourly space velocity on the conversion of methane and $H_2$/CO ratio of Tri-reforming of methane. The product analysis presented in Table-4.

Process Conditions:
  Catalyst: 0.030 g
  Ni:ZrO2 weight ratio in the catalyst=5:95.
  Process pressure: 1 atm.
  Temperature: 800° C.
  Reaction time: 4 h
  $O_2$:$CO_2$:$H_2O$:$CH_4$:He=1:1:2.1:5:18 (mol %)

TABLE 4

Effect of temperature on conversion

| GHSV (ml/h/gcat) | Methane Conversion (%) | $CO_2$ Conversion (%) | $H_2O$ Conversion (%) | Syngas $H_2$/CO ratio |
|---|---|---|---|---|
| 20000 | 99.35 | 98.76 | 98.73 | 1.9 |
| 40000 | 98.48 | 98.69 | 98.05 | 1.9 |
| 80000 | 97.57 | 98.67 | 97.98 | 1.9 |
| 160000 | 97.32 | 98.56 | 98.23 | 1.9 |
| 320000 | 94.95 | 95.53 | 95.69 | 1.9 |
| 400000 | 94.46 | 94.86 | 93.78 | 1.9 |

Example 8

The example describes the effect of gas hourly space velocity on the conversion of methane and $H_2$/CO ratio of Tri-reforming of methane. The product analysis presented in Table-5.

Process Conditions
  Catalyst: 0.06 g
  Ni:ZrO2 weight ratio in the catalyst=5:95.
  Process pressure: 1 atm.
  Temperature: 800° C.
  Gas hourly space velocity (GHSV): 80000 ml g$^{-1}$ h$^{-1}$
  $O_2$:$CO_2$:$H_2O$:$CH_4$:He=1:1:2.1:5:18 (mol %)

TABLE 5

Effect of Time on Stream (TOS) on the conversion of methane

| Time (h) | Methane Conv. (%) | CO2 Conv. (%) | H2O Conv. (%) | H2/CO ratio |
|---|---|---|---|---|
| 0 | 97.32 | 98.56 | 98.23 | 1.9 |
| 1 | 96.78 | 98.03 | 98.33 | 1.9 |
| 2 | 96.69 | 97.78 | 98.12 | 1.9 |
| 4 | 97.89 | 97.56 | 97.63 | 1.9 |
| 5 | 97.54 | 97.23 | 97.73 | 1.9 |
| 6 | 97.23 | 97.17 | 97.73 | 1.9 |
| 7 | 97.33 | 97.67 | 97.52 | 1.9 |
| 8 | 97.29 | 97.57 | 96.89 | 1.9 |
| 10 | 96.87 | 97.45 | 96.75 | 1.9 |
| 15 | 96.67 | 97.56 | 97.64 | 1.9 |
| 20 | 96.89 | 97.46 | 96.53 | 1.9 |
| 25 | 96.45 | 96.88 | 96.65 | 1.9 |
| 30 | 96.78 | 96.53 | 97.55 | 1.9 |
| 35 | 96.79 | 96.56 | 96.63 | 1.9 |
| 40 | 96.64 | 96.54 | 96.23 | 1.9 |
| 50 | 96.84 | 96.56 | 96.64 | 1.9 |
| 60 | 95.78 | 95.92 | 95.32 | 1.9 |
| 70 | 95.32 | 95.23 | 95.04 | 1.9 |

ADVANTAGES OF THE INVENTION

The main advantages of the present invention are:
The process of the present invention is to utilize methane by converting methane to syngas through Tri-reforming of methane in a single step with a single catalyst.
The process of the present invention is to utilize carbon dioxide to produce syngas through Tri-reforming of methane in a single step with a single catalyst.

The process of the present invention is to utilize steam by to produce syngas through Tri-reforming of methane in a single step with a single catalyst.

The process provides not only good conversion but also good $H_2/CO$ ratio of syngas.

The process utilizes a major component of abandoned natural gas to produce syngas with $H_2/CO$ ratio almost equal to two, which become the major advantages of this process and which can be directly use for the production of methanol and Fischer-Tropsch synthesis.

The process utilizes three greenhouse gasses to produce synthesis gas.

The process does not produce any major by-products which is also a major advantage of this process.

The catalyst shows no deactivation up to 70 h time on stream at 800° C.;

The catalyst is used in very low amounts.

We claim:

1. A nano Ni—Zr oxide catalyst having the formula NiO—$ZrO_2$ consisting essentially of NiO in the range of 1-10 wt % and $ZrO_2$ in the range 90-99 wt %, wherein the NiO—$ZrO_2$ catalyst is a co-precipitated catalyst, and wherein the co-precipitated catalyst has a particle size in the range of 20 nm to 100 nm.

2. A process for the preparation of nano Ni—Zr oxide catalyst of claim 1, comprising:
   (a) stirring a solution of Zr salt, Ni-salt, a surfactant and $H_2O$ for a period ranging between 2-3 hours at a temperature ranging between 25-350° C. followed by adding hydrazine hydrate subsequently followed by a $Na_2CO_3$ solution to adjust the pH in the range of 11-12;
   (b) stirring a reaction mixture obtained in step (a) for a period ranging between 1-3 hours at temperature ranging between 25-350° C. followed by heating the mixture in an autoclave at temperature ranging between 170° C. to 180° C. for the time period ranging between 18-24 hours to obtain precipitate; and
   (c) filtering the precipitate as obtained in step (b) with water and ethanol then dried at temperature ranging between 60° C.-110° C. for a time period ranging between 15-20 hours followed by calcinating the dried product at a temperature in the range of 400-750° C. for a time period in the of 4-10 hours to obtain NiO—$ZrO_2$ oxide.

3. The process of claim 2, wherein Zr salt used in step (a) is zirconium propoxide.

4. The process of claim 2, wherein Ni salt used in step (a) is Nickel nitrate hexahydrate.

5. The process of claim 2, wherein surfactant used in step (a) is Cetyltrimethyl ammonium bromide (CTAB).

6. The process of claim 2, wherein wt % ratio of Ni and Zr is in the range of 1:99 to 10:90.

7. A process for activation of methane using the catalyst of claim 1 to obtain syngas comprising passing $O_2$:$CO_2$:$H_2O$:$CH_4$:He in the molar ratio ranging between 1:1:1.7:5:18 to 1:1:2.4:5:18 ratio in a reactor at atmospheric pressure in the presence of the co-precipitated NiO—$ZrO_2$ catalyst at a temperature ranging between 600-800° C. for a period ranging between 1-70 hours at a gas hourly space velocity (GSHV) ranging between 20000-400000 $mlg^{-1} h^{-1}$ to obtain syngas.

8. The process of claim 7, wherein conversion percentage of methane is in the range of 1-97%.

9. The process of claim 7, wherein conversion percentage of $CO_2$ is in the range of 1-98%.

10. The process of claim 7, wherein conversion percentage of $H_2O$ is in the range of 1-98%.

11. The process of claim 7, wherein $H_2/CO$ ratio of syngas obtained is in the range of 1.8-2.2.

* * * * *